Patented Dec. 30, 1941

2,267,734

UNITED STATES PATENT OFFICE 2,267,734

PYRIDINE CARBOXYLIC ACID AND THE COPPER SALTS THEREOF

Clyde O. Henke, Wilmington, Del., Roland G. Benner, Carney's Point, N. J., and Robert B. Scott, Jr., Wilmington, Del., assignors to E. I. du Pont de Nemours & Company, Wilmington, Del., a corporation of Delaware No Drawing. Application December 14, 1940, Serial No. 370,148

11 Claims. (Cl. 260—270)

This invention relates to processes for the controlled oxidation of alkyl pyridines whereby an alkyl group is oxidized to a carboxy group, and especially to processes of manufacturing such pyridine carboxylic acids, the copper and other salts of said acids.

Heretofore alkyl pyridines, such as alpha-picoline have been oxidized to their carboxylic acids by the action of potassium permanganate or manganese dioxide. Fairly good yields are obtained but the processes are costly because of the difficulties involved in separating the manganese sludge from the desired oxidation product and costs for process materials. Picolinic acid has also been made by photochemically oxidizing alpha-picoline in a benzene solution and in the presence of a small amount of anthraquinone. After exposing the reaction mixture for five months to photochemical action, about 5% to 6% of the alkyl pyridine was converted to picolinic acid. This method of oxidation is likewise costly and it was desirable to provide more practicable methods for the production of such carboxylic acid compounds.

It is among the objects of the present invention to provide novel oxidation processes for converting alkyl pyridines to the corresponding mono-carboxylic acids thereof. Another object of the invention is to provide processes which produce the desired products economically and in good yield. Another object of the invention is to provide new methods of producing mono-carboxy derivatives of pyridine from alkyl pyridines. Other objects of the invention will be apparent from the following description.

The objects of the invention are attained in general by disposing the alkyl pyridine in liquid phase and acting on the mixture at a temperature of about 75° C. to about 300° C. with gaseous oxygen and in the presence of a copper salt of a fatty acid which contains at least two carbons. The reaction mixture may comprise a solvent for the alkyl pyridine and if desired, the copper salt of the fatty acid may be generated in the mixture from the fatty acid and copper or from other compounds. A volatile compound may desirably be contained in the reaction mixture to alter the explosive range of the gases in the reaction vessel when more convenient or safer operating conditions would be promoted by such an alteration. Compounds which promote or regulate the reaction may also be present.

The invention will be more fully set forth in the following more detailed description which includes examples that are given as illustrative embodiments of the invention and not as limitations thereof. Parts are expressed in parts by weight unless otherwise noted.

*Example I*

Into a closed molybdenum stainless steel autoclave provided with agitation, adjustable venting and inlet means, were charged 100 parts of alpha-picoline, 400 parts of benzene, 38½ parts of cuprous oxide, 65 parts of acetic acid, and 15 parts of sodium acetate trihydrate. The autoclave was closed and the charge was oxidized by pumping air through the charge, the charge being heated to 120° to 125° C. and the pressure being maintained at 425 to 475 pounds per square inch gauge by adjustment of the rates of admitting air and venting spent gases. After an analysis of the vented gases indicated no appreciable oxygen absorption, the reaction mass was cooled and removed from the autoclave. Benzene was distilled from this mixture, 225 parts being recovered.

To an aqueous slurry of the residual mixture were added 265 parts of 30% hydrochloric acid and 20 parts of charcoal. The mass was then heated to the boil and filtered while hot. The charcoal-containing filter cake was washed with 100 parts of hot 10% hydrochloric acid to remove any undissolved copper picolinate.

The filtrate was made neutral to Congo Red indicator and cooled to room temperature. The copper picolinate which crystallized from the cooled filtrate was filtered off and washed with cool water. A filter cake containing 123 parts of crystalline copper picolinate of good quality, representing a 74% conversion was obtained. The copper picolinate may be converted to other salts of picolinic acid or to the free acid by known methods.

*Example II*

A mixture consisting of 100 parts of alpha-picoline, 400 parts of benzene, 107 parts of cupric acetate monohydrate, and 15 parts of sodium acetate trihydrate was charged into an autoclave like that described in Example I. The charge was oxidized as described in Example I except that the temperature was maintained at 135° to 140° C. and the pressure was maintained at 625 to 675 lbs. per sq. in. gauge. A filter cake containing 126 parts of copper picolinate of good quality, representing a 76% conversion, was produced.

*Example III*

A mixture of consisting of 100 parts of alpha-picoline, 400 parts of benzene, 107 parts of cupric acetate monohydrate, and 15 parts of sodium acetate trihydrate was charged into the autoclave described in Example I. The charge was oxidized as described in Example I except that the temperature and pressure were maintained at 105° to 110° C. and at 325 to 375 lbs.

per sq. in. gauge. Copper picolinate of good quality was obtained.

*Example IV*

A mixture consisting of 100 parts of alpha-picoline, 400 parts of benzene, 65 parts of acetic acid, 134 parts of cupric sulfate pentahydrate, and 29 parts of sodium acetate trihydrate was charged into the autoclave described in Example I. The charge was oxidized as described in Example I. Copper picolinate of good quality was obtained.

*Example V*

A mixture composed of 100 parts of alpha-picoline, 400 parts of benzene, and 107 parts of cupric acetate monohydrate was charged into a closed molybdenum stainless steel autoclave which was provided with an agitator. The charge was oxidized with oxygen gas at 140° to 145° C. under 150 to 200 lbs. per sq. in. gauge. Fresh oxygen was admitted in order to maintain this pressure until the rate of oxygen absorption markedly decreased. Otherwise the process was carried out in a manner similar to that of Example I. The filter cake contained 135 parts of copper picolinate of good quality, representing a conversion of 81%.

*Example VI*

A mixture composed of 100 parts of alpha-picoline, 61 parts of acetic acid, 316 parts of water, 23 parts of benzene, 5 parts of methyl ethyl ketone, and 105 parts of cuprous chloride was charged into the autoclave described in Example V. The charge was oxidized as described in Example V except that the temperature and gauge pressure were maintained at 180° to 185° C. and 250 to 300 lbs. per sq. in. respectively. Copper picolinate of good quality was obtained.

*Example VII*

A mixture consisting of 100 parts of alpha-picoline, 100 parts of cyclohexane, and 107 parts of cupric acetate monohydrate was charged into the autoclave used in Example V. The charge was oxidized as described in Example V. Copper picolinate of good quality was obtained.

*Example VIII*

A charge consisting of 100 parts of alpha-picoline, 100 parts of n-hexane (essentially), and 107 parts of cupric acetate monohydrate was charged into the autoclave used in Example V. The charge was oxidized as described in Example V. Copper picolinate of good quality was obtained.

*Example IX*

A mixture consisting of 100 parts of alpha-picoline, 400 parts of water, 2 parts of benzene, and 107 parts of cupric acetate monohydrate was charged into the autoclave used in Example V. The charge was oxidized as described in Example V. Copper picolinate of good quality was obtained.

*Example X*

A mixture consisting of 100 parts of alpha-picoline, 61 parts of acetic acid, 23 parts of 28% ammonia solution, 23 parts of benzene, 5 parts of methyl ethyl ketone, and 105 parts of cupric sulfate pentahydrate was charged into the autoclave used in Example V. The charge was oxidized as described in Example V except that the temperature and gauge pressure were maintained at 180° to 185° C. and 250 to 300 lbs. per sq. in. respectively. Copper picolinate of good quality was obtained.

*Example XI*

By treating a charge consisting of 100 parts of alpha-picoline, 387 parts of acetic acid, 23 parts of benzene, 5 parts of methyl ethyl ketone, 105 parts of cupric acetate monohydrate, and 5 parts of cobaltous acetate tetrahydrate as described in Example X, copper picolinate of good quality was obtained.

*Example XII*

The procedure of Example X was carried out with a charge consisting of 100 parts of alpha-picoline, 387 parts of acetic acid, 23 parts of benzene, 5 parts of methyl ethyl ketone, 105 parts of cupric acetate monohydrate, and 5 parts of hydrated chromic acetate. Copper picolinate of good quality was obtained.

*Example XIII*

A charge consisting of 100 parts of alpha-picoline, 400 parts of acetic acid, 2 parts of benzene, and 107 parts of cupric acetate monohydrate was treated as described in Example V except that the temperature and gauge pressure maintained during the oxidation were 155° to 160° C. and 250 to 300 lbs. per sq. in. respectively. Copper picolinate of good quality was obtained.

*Example XIV*

A charge consisting of 100 parts of alpha-picoline, ½ part of benzene, and 21½ parts of cupric acetate monohydrate was treated as described in Example V. Some of the alpha-picoline was not oxidized but was recoverable. A filter cake containing copper picolinate of good quality was obtained.

*Example XV*

A charge consisting of 100 parts of alpha-picoline, 100 parts of benzene, and 113 parts of cupric acetate monohydrate was treated as described in Example V except that the temperature and gauge pressure maintained during the oxidation were 130° to 135° C. and 100 to 150 lbs. per sq. in. respectively. The filter cake contained 133 parts of copper picolinate of good quality, representing an 80% conversion.

*Example XVI*

A charge consisting of 100 parts of alpha-picoline, 385 parts of acetic acid, and 105 parts of cupric acetate monohydrate was charged into a glass vessel equipped with an agitator and a reflux condenser. Oxygen was bubbled through the agitating charge at atmospheric pressure. The charge was maintained with refluxing at 115° to 120° C. during the oxidation. Copper picolinate of good quality was obtained.

*Example XVII*

A charge consisting of 100 parts of alpha-picoline, 320 parts of xylene, and 105 parts of cupric acetate monohydrate was charged into a glass vessel equipped with an agitator and a reflux condenser. Oxygen was bubbled through the agitating charge which was maintained with refluxing at 140° to 145° C. Under atmospheric pressure copper picolinate of good quality was obtained.

*Example XVIII*

Into a steel autoclave equipped for agitation a charge consisting of 100 parts of alpha-picoline, 400 parts of benzene, 66 parts of acetic acid, 47½ parts of copper oxide residue containing 89½% cupric oxide obtained from conversion of copper picolinate to sodium picolinate with caustic soda, and 14½ parts of sodium acetate trihydrate was treated as described in Example V except that the temperature and gauge pressure during oxidation were maintained at 130° to 135° C. and 125 to 150 lbs. per sq. in. respectively. Copper picolinate of good quality was obtained.

The oxidation may be carried out over a wide range of temperature from about 75° C. to about 300° C. Better conversions are obtained with oxidation temperatures of about 105° C. to about 160° C. and this range is preferred. Pressures can be used ranging from ordinary atmospheric pressures to about 10,000 pounds per sq. in. gauge or even higher, the highest pressures being limited by the construction of the equipment. Pressures of about 50 to about 1500 pounds per square inch gauge are preferred, depending upon the temperature of the reaction medium and the explosion range of the gases. It is desirable for purposes of safety to include in the charge a substantially inert volatile liquid, such as benzene to avoid dangerous explosive mixtures of gases in the reaction vessel which might be present if the addition of such a volatile liquid were not made, but the presence of a volatile liquid for this purpose is not essential for effecting oxidation. It is sometimes desirable to include the liquid in the original charge if the liquid is intended to act also as a solvent for the alkyl pyridine.

The oxidation is carried out in liquid phase. A solvent which does not inhibit the oxidation is used. An excess of the alkyl pyridine may act as the solvent, the reaction halting when sufficient alkyl pyridine has been converted to the pyridine carboxylic acid which is stoichiometrically equivalent to the copper catalyst. Benzene is the preferred solvent but other solvents which do not inhibit the oxidation can be used, such as toluene, xylenes, cyclohexane, n-hexane, acetic acid, water, aliphatic alcohols, pyridine and combinations thereof. From the illustrations already recited it will be evident that a great variety of such solvents can be used.

About 75 to about 500 parts of solvent per 100 parts of the alkyl pyridine are generally preferred but more or less can be used. A large excess can be used, if desired, as the solvent is generally recoverable. It is generally preferable to slurry the catalyst into the solvent and to add the alkyl pyridine to this mixture, but these constituents may be mixed in any order.

Any copper oxidation catalyst consisting of a copper salt of a straight or branched chain saturated aliphatic carboxylic acid containing 2 to 20 carbons can be used. The copper salt of the fatty acid can be added as such or can be generated in the charge from copper, copper oxides, salts of copper or other copper compounds by the action of a fatty acid, oxygen containing gases or both.

As illustrations of copper containing compounds which may be used directly as the catalyst or through generation in the reaction medium are cuprous oxide, cupric oxide, cuprous and cupric chloride and sulfate, ammonium complexes of copper salts, cupric acetate, copper oleate, copper linoleate, copper caprylate and copper propionate. Copper acetate which is generated in the charge from acetic acid and cuprous and cupric oxides is the preferred catalyst. Copper is preferably present in about the stoichiometric amount to form the copper salt of the carboxylic acid produced, but an excess may desirably be present to increase the rate of reaction. When less than the stoichiometric amount is present to combine with all the acid which is capable of being formed from the alkyl pyridine in the mixture, the production of pyridine carboxylic acid is limited by the copper which is capable of being combined.

A compound which acts to regulate the reaction may desirably be present. Such regulators are inorganic acetate salts, such as sodium, potassium, ammonium, cobalt and chromium. Of these, sodium acetate is preferred.

As the starting compound, any C-substituted pyridine having at least one substituent consisting of a straight or branched chain aliphatic group containing 1 to 6 carbons can be used, but more than one such group may be present. Accordingly any alkyl pyridine which is mono- or poly-substituted can be used. However, alkyl pyridines which are substituted by other groups besides alkyl groups can be used. As illustrations of such compounds are mentioned alpha-, beta- and gamma-methyl pyridines, dimethyl and trimethyl pyridines such as lutidine and collidine, the ethyl pyridines and mixtures of any of these compounds. Alpha-picoline is the preferred starting compound.

The copper can be removed from the product of the reaction by various methods, such as precipitating the copper with hydrogen sulfide in a non-alkaline medium, thereby producing the pyridine carboxylic acid. The sodium salt of the acid may be produced from the copper salt by precipitating the copper with caustic soda.

In the separation of copper picolinate from the reaction medium it is preferable to dissolve the copper picolinate in an acid, such as hydrochloric, nitric, sulfuric or acetic and then neutralizing. When unwanted undissolved solids are present in the solution or when an especially purified product is desired, the impurities are removed from the acid solution by clarification, as with charcoal, and filtration or by other means, such as the addition of a controlled amount of an oxidizing agent. Upon neutralizing the excess acid and cooling, the copper salt of the pyridinyl carboxylic acid crystallizes out leaving only insignificant amounts of the copper salt in solution. About 71 parts of hydrochloric acid to 100 parts of copper picolinate give excellent results in this separation, but more or less of the acid can be used. Alkali-metal and alkaline earth metal carbonates, oxides and hydroxides are suitable neutralizing agents, such as caustic soda or potash, soda ash, limestone, calcium hydroxide or dolomite. When the acid solution of copper picolinate does not contain objectionable solids or impurities, the removal thereof can be omitted, and when other adventitious substances may be present in the product, the copper picolinate can be separated directly from the reaction medium by neutralization.

For the best results it is necessary to avoid the presence of substances in or in contact with the reaction medium which inhibit the catalytic action. For this purpose it is necessary to use a reaction vessel in which the parts in contact with the reaction mixture are composed of material which does not inhibit the reaction. The term, non-inhibiting material, as used in the specification and claims refers to materials which do not operate directly to materially hinder the progress of the reaction or give rise to salts or compounds which have an inhibiting effect. Such vessels may be composed entirely of non-inhibiting material when other considerations make it desirable but it is only necessary that those parts of the vessel which come in contact with the reaction medium be composed of such a material. It is desirable also that the non-inhibiting material be resistant to the acid and oxidizing conditions present in the mixture. Glass, acid resistant enamel, stainless steel such as the alloy containing about 8% nickel, about 18% chromium, a small percentage of carbon, and the remainder mainly iron, molybdenum stainless steel such as the alloy containing about 1.1% manganese, about 2.7% molybdenum, about 10.2% nickel, about 16.7% chromium and the remainder mainly iron and various alloys composed mainly of non-ferrous constituents, such as molybdenum about 24 to 33%, nickel about 60 to 70% and iron from about 2% to about 7% can be used. Of these, molybdenum stainless steel is preferred from the standpoint of its non-inhibiting properties, its resistance to acid and oxidizing conditions present in the reaction mixture and its general utility as a material of construction.

From the foregoing disclosure it will be recognized that the invention is susceptible of modification without departing from the spirit and scope thereof and it is to be understood that the invention is not restricted to the specific illustrations thereof herein set forth.

We claim:

1. In the process of oxidizing in liquid phase a pyridine which has at least one C-substituted alkyl group having 1 to 6 carbons, the steps which comprise heating in the presence of a copper salt of a fatty acid which contains 2 to 20 carbons and oxygen until an alkyl group of said pyridine is oxidized to carboxy, the temperature of said mixture being about 75° C. to about 300° C. and said mixture being under a pressure of at least one atmosphere.

2. In the process of oxidizing in liquid phase a pyridine which has at least one C-substituted alkayl group having 1 to 6 carbons, the steps which comprise heating in the presence of a copper salt of a fatty acid which contains 2 to 20 carbons and oxygen until an alkyl group of said pyridine is oxidized to carboxy, the temperature of said mixture being about 75° C. to about 300° C. and said mixture being under a pressure of at least one atmosphere, said oxidation being carried out in a reaction vessel in which the parts in contact with the reaction mixture are composed of material which is non-inhibiting.

3. In the process of oxidizing in liquid phase a pyridine which has at least one C-substituted alkyl group having 1 to 6 carbons, the steps which comprise heating in the presence of a copper salt of a fatty acid which contains 2 to 20 carbons and oxygen until an alkyl group of said pyridine is oxidized to carboxy, the temperature of said mixture being about 75° C. to about 300° C. and said mixture being under a pressure of at least one atmosphere, said oxidation being carried out in a reaction vessel in which the parts in contact with the reaction mixture are composed of molybdenum stainless steel.

4. In the process of oxidizing in liquid phase a pyridine which has at least one C-substituted alkyl group having 1 to 6 carbons, the steps which comprise heating in the presence of a copper salt of a fatty acid which contains 2 to 20 carbons and air, until an alkyl group of said pyridine is oxidized to carboxy, the temperature of said mixture being about 75° C. to about 300° C. and the pressure being at least one atmosphere.

5. The process which comprises passing oxygen through a fluid mixture containing a pyridine which has at least one C-substituted alkyl group having 1 to 6 carbons and a copper salt of a fatty acid which contains 2 to 20 carbons, until an alkyl group of said pyridine is oxidized to carboxy, the temperature of said mixture being about 75° C. to about 300° C. and the pressure being at least one atmosphere.

6. The process which comprises passing oxygenating gas through a fluid mixture containing a pyridine which has at least one C-substituted alkyl group having 1 to 6 carbons, a copper salt of a fatty acid which contains 2 to 20 carbons and a solvent, until an alkyl group of said pyridine is oxidized to carboxy, the temperature of said mixture being about 75° C. to about 300° C. and the pressure being at least one atmosphere.

7. The process which comprises passing air through a fluid mixture containing a pyridine which has at least one C-substituted alkyl group having 1 to 6 carbons, a copper salt of a fatty acid which contains 2 to 20 carbons and a solvent, until an alkyl group of said pyridine is oxidized to carboxy, the temperature of said mixture being about 75° C. to about 300° C. and the pressure being at least one atmosphere.

8. The process which comprises passing oxygenating gas through a liquid mixture containing a pyridine which has at least one C-substituted methyl group, copper acetate and a solvent, until a methyl group is oxidized to carboxy, the temperature of said mixture being about 105° C. to about 160° C. and the pressure being about 50 to about 1500 pounds per square inch gauge.

9. The process which comprises passing oxygenating gas through a liquid mixture containing alpha picoline, copper acetate and a solvent, until the alkyl group is oxidized to carboxy, the temperature of said mixture being about 105° C. to about 160° C. and the pressure being about 50 to about 1500 pounds per square inch gauge.

10. The process which comprises passing oxygenating gas through a liquid mixture containing a pyridine which has a C-substituted methyl group, copper acetate and benzene, until the alkyl group is oxidized to carboxy, the temperature of said mixture being about 105° C. to about 160° C. and the pressure being about 50 to about 1500 pounds per square inch gauge.

11. The process which comprises passing air through a liquid mixture containing copper acetate and a solution of alpha picoline in benzene until the alkyl group of said picoline is oxidized to carboxy, and vented gas indicates that an appreciable amount of oxygen is no longer being reacted, the temperature of said mixture being about 105° C. to about 160° C. and the pressure being about 50 to about 1500 pounds per square inch gauge.

CLYDE O. HENKE.
ROLAND G. BENNER.
ROBERT B. SCOTT, Jr.